US010774794B2

(12) United States Patent
Uehane et al.

(10) Patent No.: US 10,774,794 B2
(45) Date of Patent: Sep. 15, 2020

(54) MULTI-CYLINDER ENGINE

(71) Applicant: Mazda Motor Corporation, Aki-gun, Hiroshima (JP)

(72) Inventors: Yoshiyuki Uehane, Hiroshima (JP); Atsuhiro Hatabu, Hiroshima (JP); Kenta Kobayashi, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 16/250,145

(22) Filed: Jan. 17, 2019

(65) Prior Publication Data

US 2019/0226428 A1 Jul. 25, 2019

(30) Foreign Application Priority Data

Jan. 23, 2018 (JP) ................................ 2018-008520

(51) Int. Cl.
*F02M 25/06* (2016.01)
*F02M 26/43* (2016.01)
(Continued)

(52) U.S. Cl.
CPC ........... *F02M 26/43* (2016.02); *F01N 13/008* (2013.01); *F01N 13/10* (2013.01); *F01N 13/105* (2013.01); *F02B 37/02* (2013.01); *F02B 75/20* (2013.01); *F02D 41/0007* (2013.01); *F02D 41/0052* (2013.01); *F02D 41/0082* (2013.01); *F02D 41/1446* (2013.01); *F02F 1/243* (2013.01);
(Continued)

(58) Field of Classification Search
CPC ...... F01N 13/008; F01N 13/10; F01N 13/105; F02B 37/02; F02B 75/20
USPC .......................................... 60/278, 323, 324
See application file for complete search history.

(56) References Cited

U.S. PATENT DOCUMENTS 9,689,300 B2 * 6/2017 Kim ...................... F01N 13/107
2005/0199215 A1 * 9/2005 Nakamoto ............ F02D 11/105
123/395
(Continued)

FOREIGN PATENT DOCUMENTS

DE 2024041 A1 * 12/1971 ............. F02F 1/243
JP H11294264 A 10/1999
(Continued)

*Primary Examiner* — Jason D Shanske
(74) *Attorney, Agent, or Firm* — Alleman Hall Creasman & Tuttle LLP

(57) ABSTRACT

A multi-cylinder engine having an engine body with a cylinder head is provided. The engine includes first and second cylinder groups, each having a plurality of independent exhaust passage parts provided to the cylinder head and connected to cylinders of the first and second cylinder groups, respectively, and first and second collective exhaust passage parts collecting the first and second pluralities of independent exhaust passage parts at a location downstream in an exhaust gas flow direction, and having an opening formed in the side surface part of the cylinder head, first and second exhaust-pipe parts each connected to the openings of the first and second collective exhaust passage parts, respectively, an exhaust gas recirculation (EGR) passage connected at one end to the first exhaust passage group and connected at the other end to an intake passage, and an exhaust gas temperature sensor provided to the first exhaust-pipe part.

9 Claims, 9 Drawing Sheets

(51) Int. Cl.

| | |
|---|---|
| ***F02M 26/47*** | (2016.01) |
| ***F02B 75/20*** | (2006.01) |
| ***F02M 26/14*** | (2016.01) |
| ***F01N 13/10*** | (2010.01) |
| ***F02M 26/41*** | (2016.01) |
| ***F02D 41/14*** | (2006.01) |
| ***F02D 41/00*** | (2006.01) |
| ***F02F 1/42*** | (2006.01) |
| ***F02F 1/24*** | (2006.01) |
| ***F01N 13/00*** | (2010.01) |
| ***F02B 37/02*** | (2006.01) |
| *F02B 75/18* | (2006.01) |

(52) U.S. Cl.

CPC ........... *F02F 1/4264* (2013.01); *F02M 26/14* (2016.02); *F02M 26/41* (2016.02); *F02M 26/47* (2016.02); *F01N 2340/06* (2013.01); *F01N 2470/00* (2013.01); *F01N 2560/06* (2013.01); *F02B 2075/1824* (2013.01); *F02F 2001/4278* (2013.01)

(56) References Cited

U.S. PATENT DOCUMENTS

| | | | | |
|---|---|---|---|---|
| 2009/0151343 | A1* | 6/2009 | Son | F01N 13/10 60/323 |
| 2011/0315098 | A1* | 12/2011 | Kosugi | F02F 1/10 123/41.74 |
| 2012/0312002 | A1* | 12/2012 | Kuhlbach | F01N 13/10 60/323 |
| 2014/0338314 | A1* | 11/2014 | Kuhlbach | F02F 1/243 60/323 |
| 2016/0265469 | A1* | 9/2016 | Harada | F02D 41/20 |
| 2016/0281592 | A1* | 9/2016 | Ishii | F01N 13/008 |
| 2017/0184005 | A1* | 6/2017 | Yamamoto | F01N 13/008 |
| 2017/0254298 | A1* | 9/2017 | Beyer | F02M 26/30 |

FOREIGN PATENT DOCUMENTS

| | | | | |
|---|---|---|---|---|
| JP | 2000265905 A | | 9/2000 | |
| JP | 2015222050 | * | 6/2017 | F01N 13/08 |

* cited by examiner

MULTI-CYLINDER ENGINE

TECHNICAL FIELD

The present disclosure relates to a multi-cylinder engine, particularly to a multi-cylinder engine provided with an exhaust gas temperature sensor.

BACKGROUND OF THE DISCLOSURE

For example, as disclosed in JP1999-294264A, there are engines for vehicles provided with an EGR (Exhaust Gas Recirculation) device which recirculates a portion of exhaust gas to an intake passage for reduction in generation of nitrogen oxide ($NO_x$) and pumping loss during intake. JP1999-294264A particularly discloses a structure in which an EGR passage is connected to some of a plurality of independent exhaust passage parts (i.e., independent exhaust pipes) connected to respective cylinders of an engine body.

JP2000-265905A discloses an engine for a vehicle, in which a plurality of independent exhaust passage parts (i.e., exhaust ports), and a collective exhaust passage part (i.e., port collecting part), which collects the plurality of independent exhaust passage parts, are formed in a cylinder head. In this engine, the plurality of independent exhaust passage parts and the collective exhaust passage part are provided inside the cylinder head, and an exhaust pipe is connected to an opening of the collective exhaust passage part which is formed in a side surface part of the cylinder head.

Meanwhile, if the structure of JP1999-294264A is incorporated into the structure of JP2000-265905A, an installation location of an exhaust gas temperature sensor may become a challenge. That is, in the engine which adopts the EGR device, although precise detection of the temperature of exhaust gas is important in terms of, for example, $NO_x$ reduction and intake charging efficiency, it is not realistic to install the exhaust gas temperature sensor inside the cylinder head, if maintainability is considered.

SUMMARY OF THE DISCLOSURE

The present disclosure is made in view of addressing the above situations, and one purpose thereof is to provide a multi-cylinder engine in which a plurality of independent exhaust passage parts and a collective exhaust passage part are formed in a cylinder head, and an exhaust gas recirculation (EGR) passage is connected to some of the plurality of independent exhaust passage parts, and which can accurately detect a temperature of exhaust gas.

According to one aspect of the present disclosure, a multi-cylinder engine having an engine body with a cylinder head is provided. The engine includes a first cylinder group provided to the engine body and comprised of a first plurality of cylinders disposed adjacent to each other, a second cylinder group provided to the engine body, comprised of a second plurality of cylinders disposed adjacent to each other, and provided adjacent to the first cylinder group, a first exhaust passage group having a first plurality of independent exhaust passage parts provided to the cylinder head and connected to the first cylinder group, respectively, and a first collective exhaust passage part collecting the first plurality of independent exhaust passage parts at a location downstream in an exhaust gas flow direction, and having an opening formed in a side surface part of the cylinder head, a second exhaust passage group having a second plurality of independent exhaust passage parts provided to the cylinder head and connected to the second cylinder group, respectively, and a second collective exhaust passage part collecting the second plurality of independent exhaust passage parts at a location downstream in the exhaust gas flow direction, and having an opening formed in the side surface part of the cylinder head, a first exhaust-pipe part connected to the opening of the first collective exhaust passage part, a second exhaust-pipe part connected to the opening of the second collective exhaust passage part, an exhaust gas recirculation (EGR) passage connected at one end to the first exhaust passage group and connected at the other end to an intake passage, and an exhaust gas temperature sensor provided to the first exhaust-pipe part.

According to this structure, the EGR passage is connected to the first exhaust passage group and the exhaust gas temperature sensor is provided to the first exhaust-pipe part. The first exhaust-pipe part is connected to the opening of the first collective exhaust passage part.

Therefore, the engine according to this structure can detect by the exhaust gas temperature sensor a temperature approximated to the temperature of the exhaust gas outflowed to the EGR passage.

Moreover, since in the engine according to this structure, the exhaust gas temperature sensor is not provided to the cylinder head but to the first exhaust-pipe part, it excels in maintainability of the exhaust gas temperature sensor.

Therefore, the engine according to this structure can accurately detect the temperature of the exhaust gas even in a structure in which the plurality of independent exhaust passage parts and the collective exhaust passage part are provided in the cylinder head and the EGR passage is connected to part of the plurality of independent exhaust passage parts.

The first exhaust-pipe part may have a first curved part where a pipe axis of the first exhaust-pipe part curves. The exhaust gas temperature sensor may be provided to the first curved part.

According to this structure, since the first exhaust-pipe part has the first curved part and the exhaust gas temperature sensor is provided to the first curved part, the temperature detection can be performed with a higher accuracy. That is, in this embodiment, by providing the first curved part to the first exhaust-pipe part, the exhaust gas introduced into the first exhaust-pipe part is mixed inside the pipe, and therefore the exhaust gas temperature sensor can detect the temperature with high accuracy.

The exhaust gas temperature sensor may be disposed radially outward of the curve from the pipe axis of the first curved part.

According to this structure, by providing the exhaust gas temperature sensor at the location radially outward in the first curved part, the temperature of the exhaust gas which flows with a fast flow velocity can be detected. Therefore, the temperature detection is possible using the exhaust gas temperature sensor with higher accuracy.

The first exhaust-pipe part may have a second curved part, provided upstream in the exhaust gas flow direction from the first curved part, where the pipe axis of the first exhaust-pipe part curves. The first curved part and the second curved part may be connected to each other with a point of inflection of the pipe axes therebetween.

According to this structure, since first curved part and the second curved part are connected to each other with the point of inflection, the exhaust gas passes through the point of inflection to eccentrically flow toward the part radially outward in the first curved part. Therefore, the engine according to this structure can detect the temperature of the exhaust gas with higher accuracy.

The multi-cylinder engine may further include a collective exhaust-pipe part provided downstream in the exhaust gas flow direction from the first exhaust-pipe part and the second exhaust-pipe part, that collects the first exhaust-pipe part and the second exhaust-pipe part.

According to this structure, since the engine is provided with the collective exhaust-pipe part that collects the first exhaust-pipe part and the second exhaust-pipe part, a reduction in the weight and size of the exhaust passage downstream of the collective exhaust-pipe part is achieved.

The second exhaust-pipe part may be formed so that a pipe axis of the second exhaust-pipe part is more linear than the pipe axis of the first exhaust-pipe part.

According to this structure, since the second exhaust-pipe part is provided relatively linearly, an exhaust resistance of the exhaust gas which passes through the second exhaust-pipe part can be lowered.

In a plan view of the second exhaust passage group in cylinder axis directions, the opening of the second collective exhaust passage part may be offset toward the first exhaust passage group in a lineup direction of the first plurality of independent exhaust passage parts. In a plan view of the first exhaust passage group in the cylinder axis directions, the opening of the first collective exhaust passage part may be disposed closer to a center in the lineup direction of the first plurality of independent exhaust passage parts, compared with the opening of the second collective exhaust passage part.

According to this structure, the disposed location of the opening of the first collective exhaust passage part and the disposed location of the opening of the second collective exhaust passage part differ from each other, thereby achieving both high-accuracy temperature detection of the exhaust gas and high exhaust efficiency.

Fuel may be injected alternately over time to the first cylinder group and the second cylinder group.

According to this structure, since the fuel injection is performed alternately over time to the first cylinder group and the second cylinder group, it can reduce the exhaust interference to achieve a higher exhaust efficiency.

DETAILED DESCRIPTION OF THE DISCLOSURE

Figure 1:
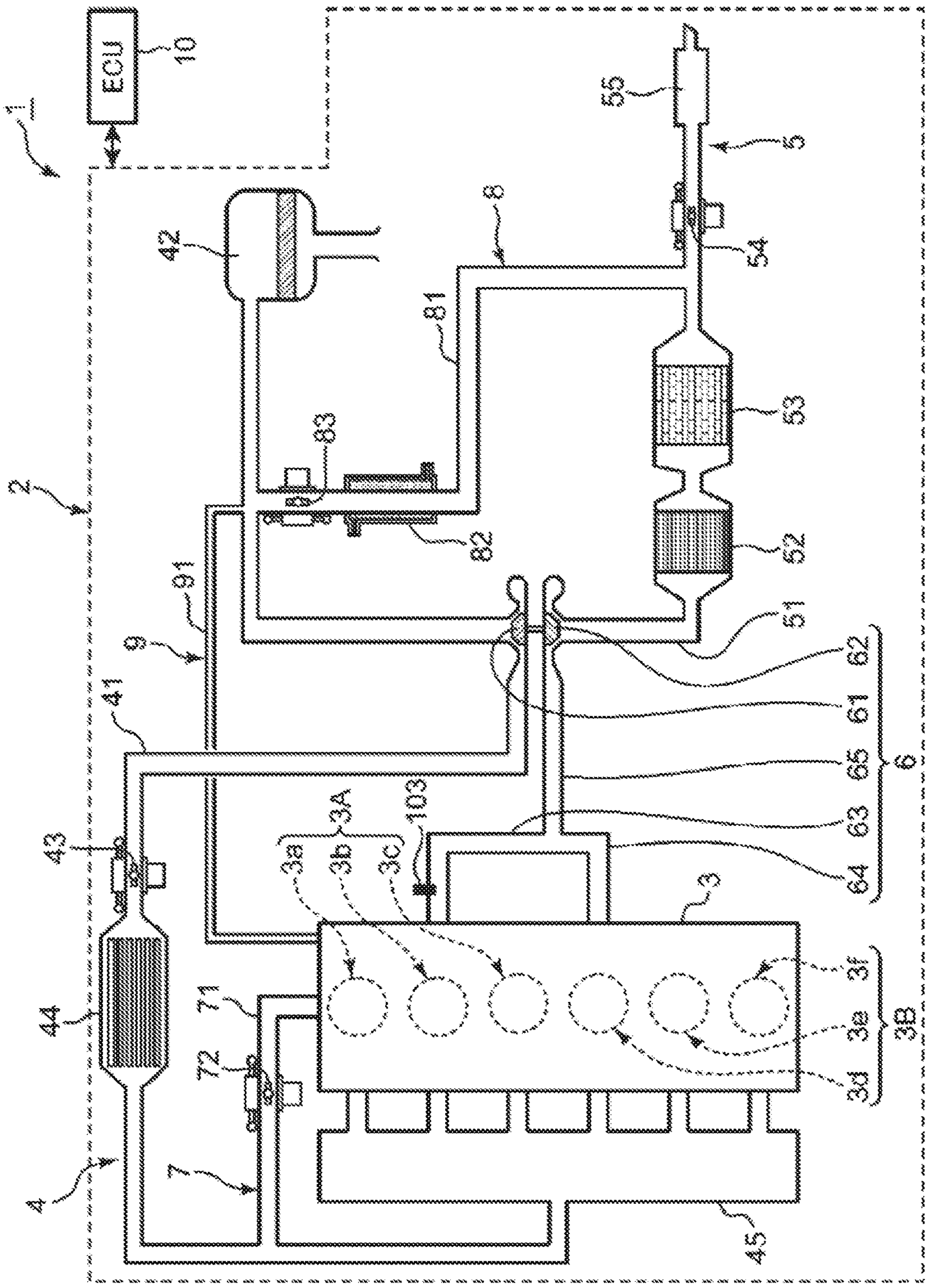
FIG. 1 is a view schematically illustrating a structure of an engine for a vehicle according to one embodiment of the present disclosure.

Hereinafter, one embodiment of the present disclosure is described, taking the accompanying drawings into consideration. Note that the form in the following description is one mode of the present disclosure, and therefore, the present disclosure is not to be limited by the following form at all except for the essential structure of the present disclosure.

Note that although detailed illustration of vehicle is omitted in the drawings used below, a +Z side is upward in up-and-down directions of the vehicle, and a −Z side is downward in the up-and-down directions of the vehicle.

Embodiment

1. Outline Structure of Multi-Cylinder Engine 2

An outline structure of a multi-cylinder engine 2 (hereinafter, simply referred to as "the engine") is described using FIG. 1.

As illustrated in FIG. 1, a vehicle 1 according to this embodiment includes, in addition to the engine 2 mounted on the vehicle 1, an ECU (Engine Control Unit) 10 which executes a driving control of the engine 2.

The engine 2 includes an engine body 3, an intake system 4, an exhaust system 5, and a turbocharger 6. In this embodiment, the engine body 3 adopts a multi-cylinder diesel engine having six cylinders 3_a_-3_f_, as one example.

The intake system 4 has an intake passage 41 connected to intake ports (not illustrated) of the engine body 3. An air cleaner 42 is provided at an upstream end of the intake passage 41, and fresh air is taken into the intake passage 41 through the air cleaner 42.

The intake passage 41 is provided with a compressor 61 of the turbocharger 6, a throttle valve 43, an intercooler 44, and a surge tank 45. Air flowing through the intake passage 41 is boosted by the compressor 61 of the turbocharger 6, and is then sent to the intercooler 44 through the throttle valve 43. The intercooler 44 cools the air which is increased in temperature due to the compression by the compressor 61.

Opening and closing of the throttle valve 43 is controlled during operation of the engine 2 so that the throttle valve 43 fundamentally maintains being in or near a fully-open state. The throttle valve 43 is closed only when it is necessary, e.g., when the engine 2 is stopped.

The surge tank 45 is provided immediately in front of a connection of the intake system 4 with the intake ports (not illustrated) of the engine body 3 to equalize an inflow air amount to the cylinders 3_a_-3_f_.

The exhaust system 5 has an exhaust passage 51 which is connected at one end to the part where a turbine 62 of the turbocharger 6 is provided. The exhaust passage 51 is provided with a DOC (Diesel Oxidation Catalyst) 52, a DPF (Diesel Particulate Filter) 53, an exhaust shutter valve 54, and a silencer 55.

The DOC 52 detoxicates CO and HC in exhaust gas discharged from the engine body 3 by oxidizing, and the DPF 53 captures particulates, such as soot, contained in the exhaust gas. The exhaust shutter valve 54 is provided between the DPF 53 and the silencer 55 in the exhaust passage, which is a valve to control a flow rate of the exhaust gas discharged outside through the silencer 55.

The turbocharger 6 includes, in addition to the compressor 61 and the turbine 62, a casing passage part 63 (i.e., a first exhaust-pipe part), a casing passage part 64 (i.e., a second exhaust-pipe part), and a casing collected part 65 (i.e., a collective exhaust-pipe part). The casing passage part 63 is connected to a first cylinder group 3A comprised of the cylinders 3*a*-3*c*, and the casing passage part 64 is connected to a second cylinder group 3B comprised of the cylinders 3*d*-3*f*. An exhaust gas temperature sensor 103 which detects the temperature of the exhaust gas is attached to the casing passage part 63, of which the details will be described later.

The casing collected part 65 is a pipe part at which the casing passage part 63 and the casing passage part 64 are collected, and is connected to the part where the turbine 62 is provided.

The engine 2 further includes an HP-EGR (High Pressure-Exhaust Gas Recirculation) device 7, an LP-EGR (Low Pressure-Exhaust Gas Recirculation) device 8, and a blowby gas device 9. The HP-EGR device 7 has an HP-EGR passage (EGR passage) 71. The HP-EGR passage 71 is provided so as to connect the intake passages 41 to the cylinder head of the engine body 3. Note that the connected part of the HP-EGR passage 71 to the intake passage 41 is located between the surge tank 45 and the intercooler 44. An EGR valve 72 is provided to the HP-EGR passage 71. The EGR valve 72 adjusts the flow rate of the exhaust gas recirculated to the intake passage 41.

The LP-EGR device 8 has an LP-EGR passage 81. The LP-EGR passage 81 is provided so as to connect the exhaust passage 51 to the intake passage 41. The connected part of the LP-EGR passage 81 to the exhaust passage 51 is located between the DPF 53 and the exhaust shutter valve 54. The connected part of the LP-EGR passage 81 to the intake passage 41 is located between the air cleaner 42 and the compressor 61 of the turbocharger 6.

An EGR cooler 82 and an EGR valve 83 are provided to the LP-EGR passage 81. The EGR valve 83 adjusts the flow rate of the exhaust gas recirculated to the intake passage 41, similar to the EGR valve 72 in the HP-EGR device 7. The EGR cooler 82 is provided in order to cool the exhaust gas to be recirculated to the intake passage 41.

The blowby gas device 9 has a blowby gas passage 91. The blowby gas passage 91 is provided so as to connect a head cover of the engine body 3 to the intake passage 41. The blowby gas passage 91 returns the blowby gas generated inside the engine body 3 to the intake passage 41.

The ECU 10 executes, for example, a control of fuel-injection timing in the engine body 3, and an opening-and-closing control of the various valves 43, 54, 72, and 83.

2. Outside Structure of Engine 2

Figure 2:
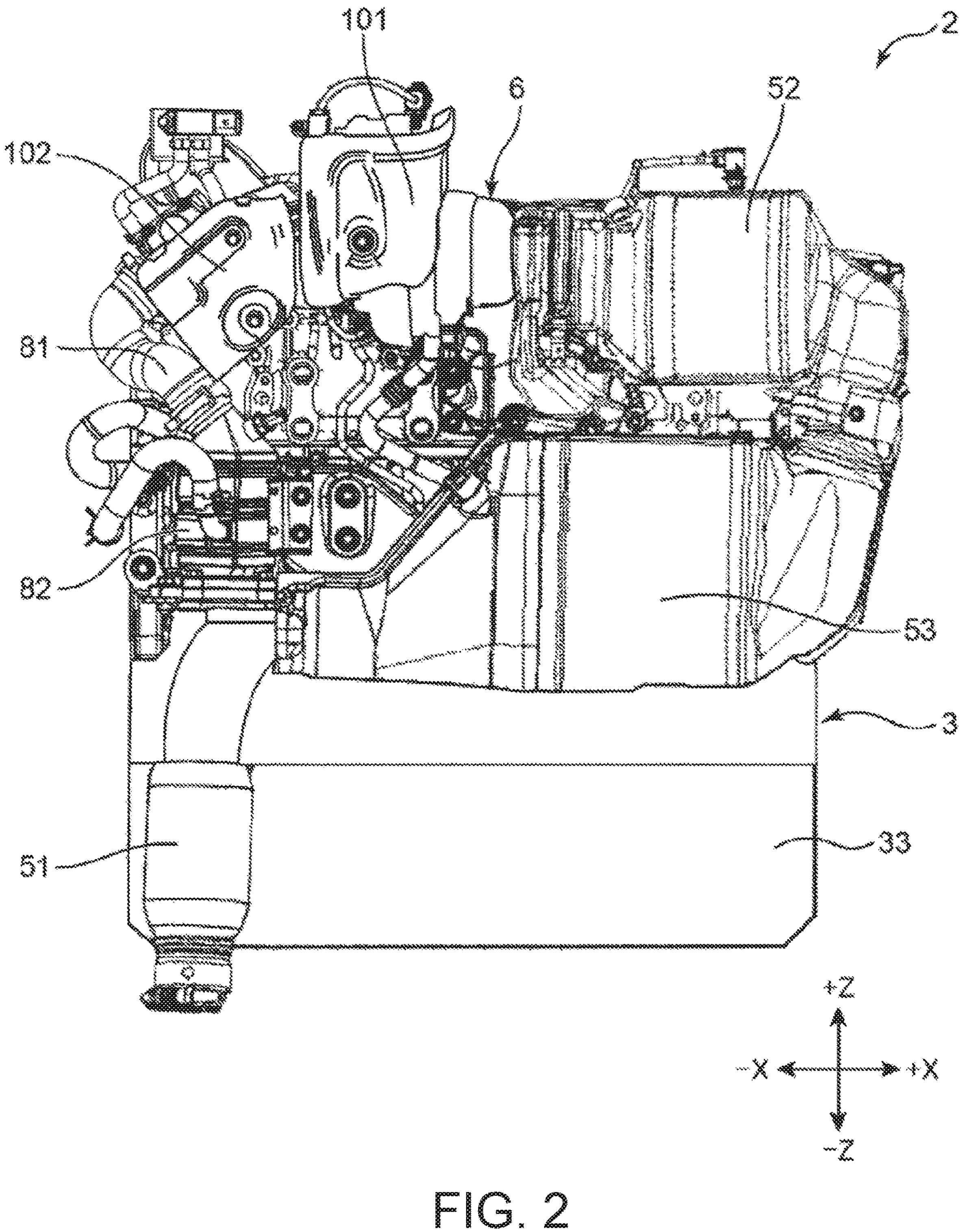
FIG. 2 is a side view schematically illustrating the engine.
Figure 3:
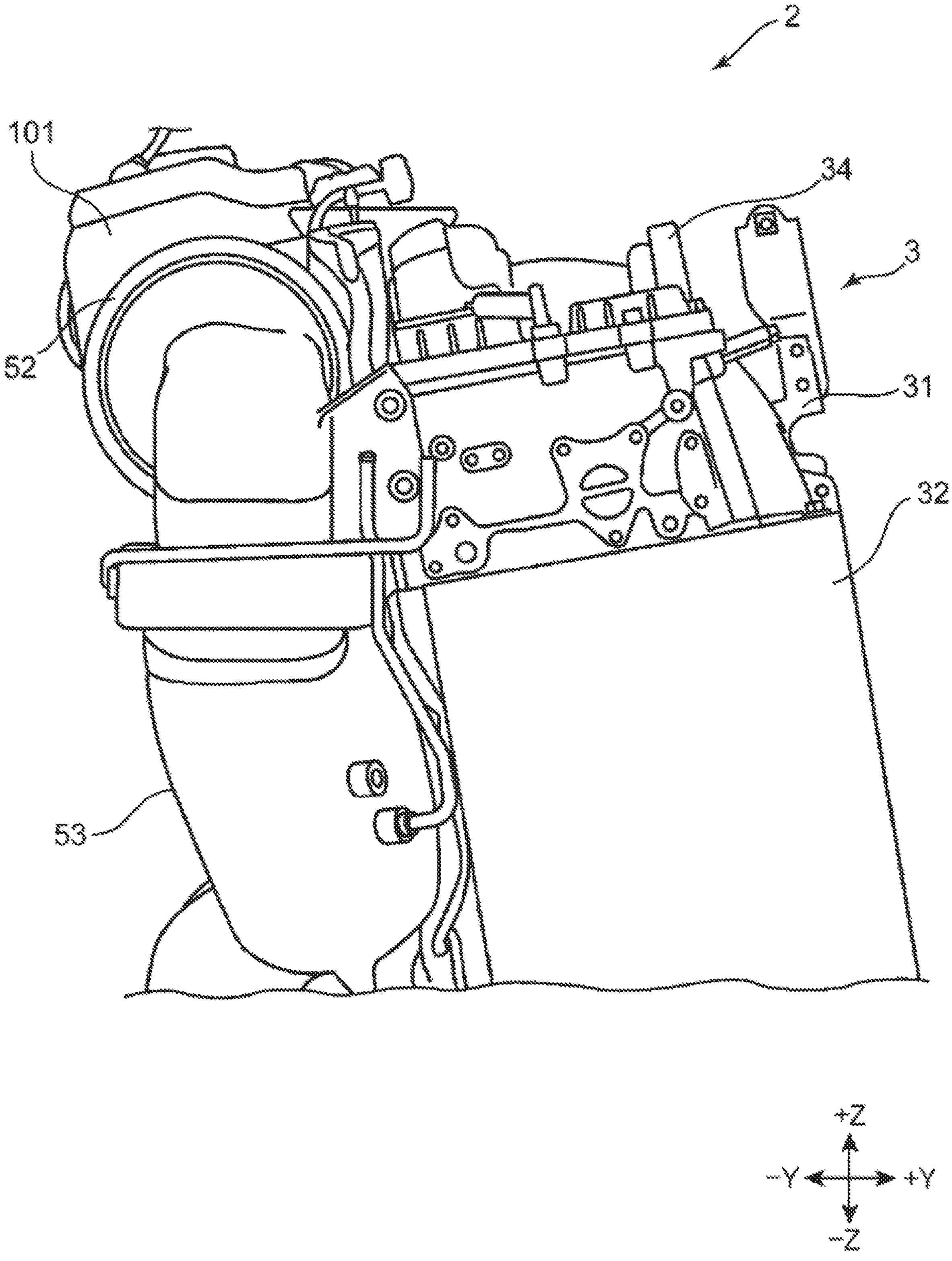
FIG. 3 is a front view schematically illustrating the engine.

The outside structure of the engine 2 is described using FIGS. 2 and 3. FIG. 2 is a side view schematically illustrating the engine 2, and FIG. 3 is a front view schematically illustrating the engine 2.

As illustrated in FIGS. 2 and 3, the LP-EGR passage 81 and the EGR cooler 82 of the LP-EGR device 8, the DOC 52 and the DPF 53 of the exhaust system 5, and the turbocharger 6 are disposed along a side surface part on the −Y side of the engine body 3 of the engine 2. The LP-EGR passage 81 is provided so as to connect an upstream part of the compressor 61 (see FIG. 1) of the turbocharger 6 disposed on the +Z side to a downstream part of the DPF 53 disposed on the −Z side. The EGR cooler 82 is disposed substantially in the Z-directions.

As illustrated in FIG. 2, the exhaust system 5 is curved in a substantially U-shape between the DOC 52 and the DPF 53. The exhaust passage 51 is bent at a part downstream of the DPF 53 (downstream in the exhaust gas flow direction) to the −Z side (toward an oil pan 33 of the engine body 3) and to the −Y side (toward a viewer of FIG. 2).

As illustrated in FIG. 3, the DOC 52 of the exhaust system 5 is disposed on the −Y side of and close to a cylinder-head 31 and a head cover 34 of the engine body 3. The DPF 53 is disposed on the −Y side of and close to a cylinder block 32 of the engine body 3.

As illustrated in FIG. 2, a cover 101 and a cover 102 are disposed on the −X side of the turbocharger 6. These covers 101 and 102 are insulated.

In this embodiment, a variable displacement turbocharger is adopted as the turbocharger 6. Thus, the turbocharger has a VGT (variable geometry turbine) actuator which varies the displacement (detailed illustration is omitted). The cover 101 is provided in order to protect the VGT actuator from heat radiated from the engine body 3 and the DPF 53 which are located nearby.

Similarly, the cover 102 is provided in order to protect the EGR valve 83 (illustration is omitted in FIGS. 2 and 3) of the LP-EGR device 8 from the heat radiated from the engine body 3 and the DPF 53 which are located nearby. Note that the covers 101 and 102 may be separately or integrally formed.

3. Spatial Relation between Cylinder Head 31 and Turbocharger 6

Figure 4:
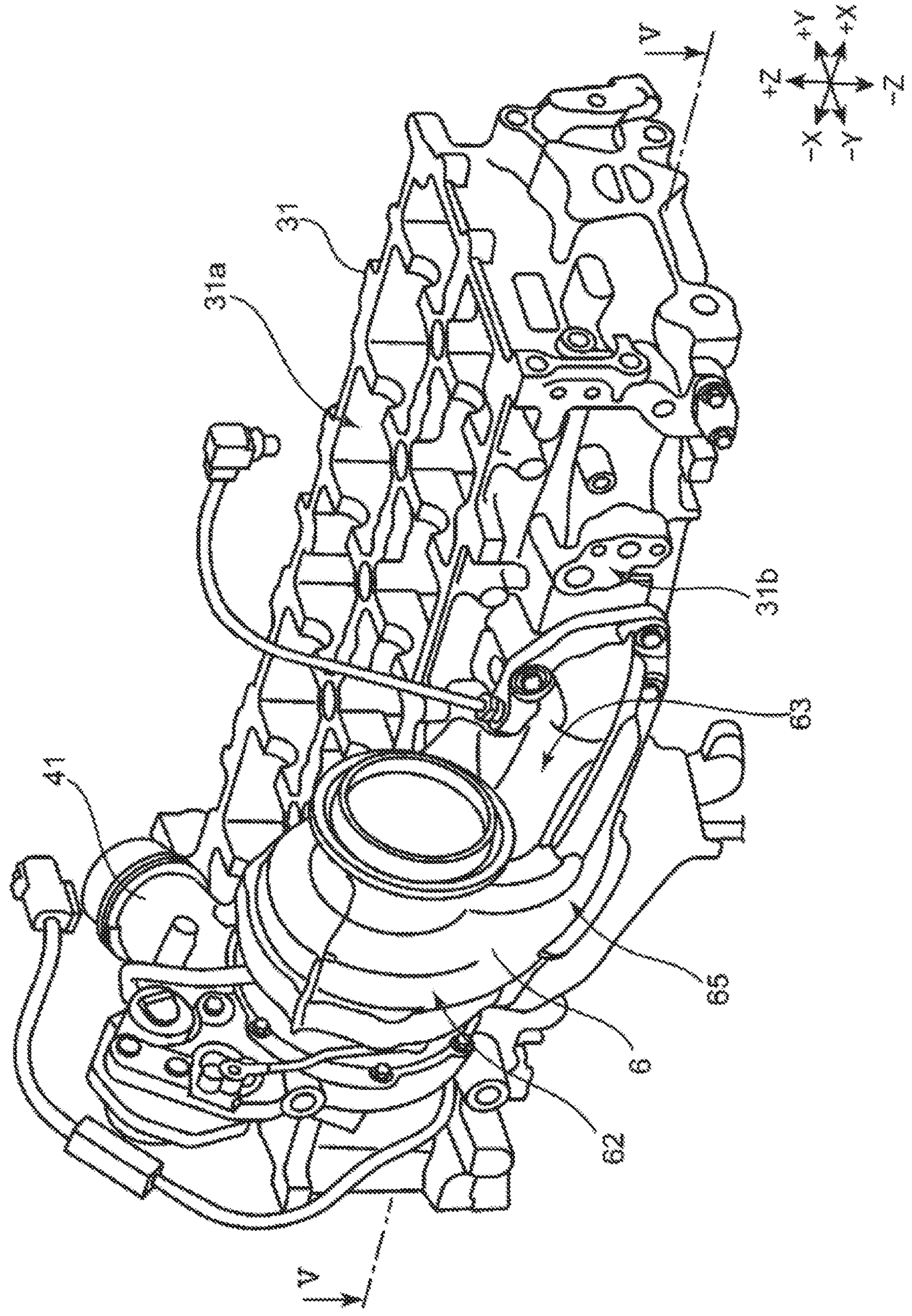
FIG. 4 is a perspective view schematically illustrating a cylinder head and a turbocharger which are removed from the engine.

A spatial relation between the cylinder head 31 and the turbocharger 6 is described using FIG. 4. FIG. 4 is a perspective view schematically illustrating the cylinder head 31 and the turbocharger 6 which are removed from the engine 2.

As illustrated in FIG. 4, the cylinder head 31 has a substantially rectangular parallelepiped shape elongated in the X-directions. The +Z side of the cylinder head 31 is opened (i.e., an upper opening 31*a*), and is closed by the head cover 34 (see FIG. 3) attached thereto.

The turbocharger 6 is disposed along a side surface part 31*b* of the cylinder head 31 on the −Y side. The casing passage parts 63 and 64 (in FIG. 4, only the casing passage part 63 is illustrated for convenience of illustration) of the turbocharger 6 are connected to the exhaust ports formed in the side surface part 31*b* of the cylinder head 31. This will be described later.

The casing collected part 65 following the casing passage parts 63 and 64 is bent to the +Z side at the −Y side of the casing passage parts 63 and 64. The casing collected part 65 is connected to the turbine 62.

4. Structures of Exhaust Ports 31*c*-31*h* and 31*j*-31*o*, and Port Collected Parts 31*i* and 31*p* of Cylinder Head 31

Figure 5:
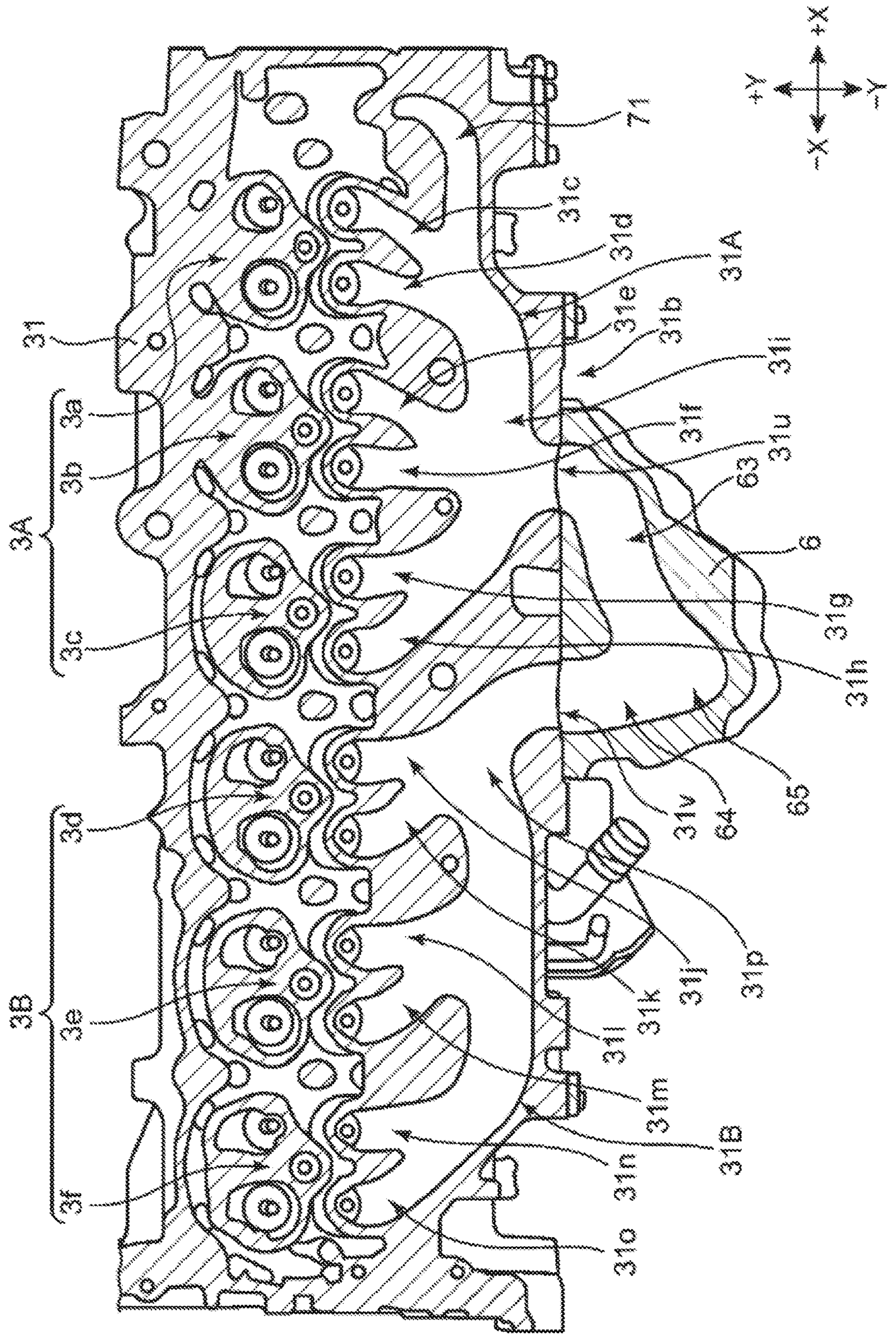
FIG. 5 is a cross-sectional view schematically illustrating a structure of exhaust ports and a port collected part in the cylinder head, taken along a line V-V in FIG. 4.

Structures of exhaust ports 31*c*-31*h* and 31*j*-31*o* and port collected parts 31*i* and 31*p* in the cylinder head 31 are described using FIG. 5. FIG. 5 is a schematic cross-sectional view taken along a line V-V in FIG. 4.

As illustrated in FIG. 5, in the engine body 3 according to this embodiment, from the +X side, a first cylinder 3*a*, a second cylinder 3*b*, a third cylinder 3*c*, a fourth cylinder 3*d*, a fifth cylinder 3*e*, and a sixth cylinder 3*f* are disposed in this order. Note that in FIG. 5, reference characters 3*a*-3*f* are assigned in order to indicate the locations corresponding to the cylinders 3*a*-3*f* in the cylinder head 31.

In this embodiment, a group comprised of the first cylinder 3*a* to the third cylinder 3*c* is referred to as a first cylinder group 3A, and a group comprised of the fourth cylinder 3*d* to the sixth cylinder 3*f* is referred to as a second cylinder group 3B. In the engine 2 according to this embodiment, the driving control is carried out so that the fuel is not injected successively to the first cylinder 3*a* to the third cylinder 3*c* belonging to the first cylinder group 3A, and similarly, the fuel is not injected successively to the fourth cylinder 3*d* to the sixth cylinder 3*f* belonging to the second cylinder group 3B. For example, in the engine 2, fuel is injected in the order of the first cylinder 3*a*=>the fifth cylinder 3*e*=>the third cylinder 3*c*=>the sixth cylinder 3*f*=>the second cylinder 3*b*=>the fourth cylinder 3*d*.

The first cylinder 3*a* is connected to the exhaust port 31*c* (independent exhaust passage part) and the exhaust port 31*d* (independent exhaust passage part). Similarly, the second cylinder 3*b* is connected to the exhaust port 31*e* (independent exhaust passage part) and the exhaust port 31*f* (independent exhaust passage part), and the third cylinder 3*c* is connected to the exhaust port 31*g* (independent exhaust passage part) and the exhaust port 31*h* (independent exhaust passage part).

The exhaust ports 31*c*-31*h* are collected at a port collected part 31*i* provided on the −Y side of the cylinder head 31. In this embodiment, the exhaust ports 31*c*-31*h* and the port collected part 31*i* are collectively referred to as a first exhaust port group 31A (i.e., first exhaust passage group). That is, in this embodiment, the exhaust passages provided corresponding to the first cylinder group 3A are referred to as the first exhaust port group 31A.

The casing passage part 63 of the turbocharger 6 is connected to the port collected part 31*i* of the first exhaust port group 31A. Specifically, the casing passage part 63 is connected to an opening 31*u* of the port collected part 31*i* on the exhaust gas downstream side.

The fourth cylinder 3*d* is connected to an exhaust port 31*j* (independent exhaust passage part) and an exhaust port 31*k* (independent exhaust passage part), and the fifth cylinder 3*e* is connected to an exhaust port 31*l* (independent exhaust passage part) and an exhaust port 31*m* (independent exhaust passage part), and the sixth cylinder 3*f* is connected to an exhaust port 31*n* (independent exhaust passage part) and an exhaust port 31*o* (independent exhaust passage part).

The exhaust ports 31*j*-31*o* are collected at the port collected part 31*p* provided on the −Y side of the cylinder head 31. In this embodiment, similarly to the above, the exhaust ports 31*j*-31*o* and the port collected part 31*p* are collectively referred to as a second exhaust port group 31B (i.e., second exhaust passage group).

The casing passage part 64 of the turbocharger 6 is connected to the port collected part 31*p* of the second exhaust port group 31B. Specifically, the casing passage part 64 is connected to an opening 31*v* of the port collected part 31*p* on the exhaust gas downstream side.

In the first exhaust port group 31A, in the X-directions, the opening 31*u* of the port collected part 31*i* is disposed substantially at the center in a range from a part where the exhaust port 31*c* is connected to the first cylinder 3*a* to a part where the exhaust port 31*h* is connected to the third cylinder 3*c*. In other words, as for the opening 31*u* of the port collected part 31*i*, the port collected part 31*i* is disposed on the −Y side of a part where the exhaust port 31*f* is connected to the second cylinder 3*b*. That is, in the first exhaust port group 31A, the exhaust ports 31*c*-31*h* have the same length (substantially the same length).

On the other hand, in the second exhaust port group 31B, in the X-directions, the opening 31*v* of the port collected part 31*p* is disposed so as to be offset to the +X side (toward the first exhaust port group 31A) from the center of a range from the part where the exhaust port 31*j* is connected to the fourth cylinder 3*d* to a part where the exhaust port 31*o* is connected to the sixth cylinder 3*f*. More specifically, the opening 31*v* of the port collected part 31*p* is disposed on the +X side from the part where the exhaust port 31*j* is connected to the fourth cylinder 3*d*.

As illustrated in FIG. 5, in the cylinder head 31 of the engine body 3, the HP-EGR passage 71 is selectively connected only to the exhaust port 31*c*. At least a part of the HP-EGR passage 71 is formed in the cylinder head 31.

The HP-EGR passage 71 extends to the +X side from the part connected to the exhaust port 31*c*, and is bent to the +Y side at a tip end portion thereof. The HP-EGR passage 71 is connected to a part on the +Y side of a junction part with the exhaust port 31*d* of the exhaust port 31*c* (on the upstream in the exhaust gas flow direction).

5. Disposed Location of Exhaust Gas Temperature Sensor 103

Figure 6:
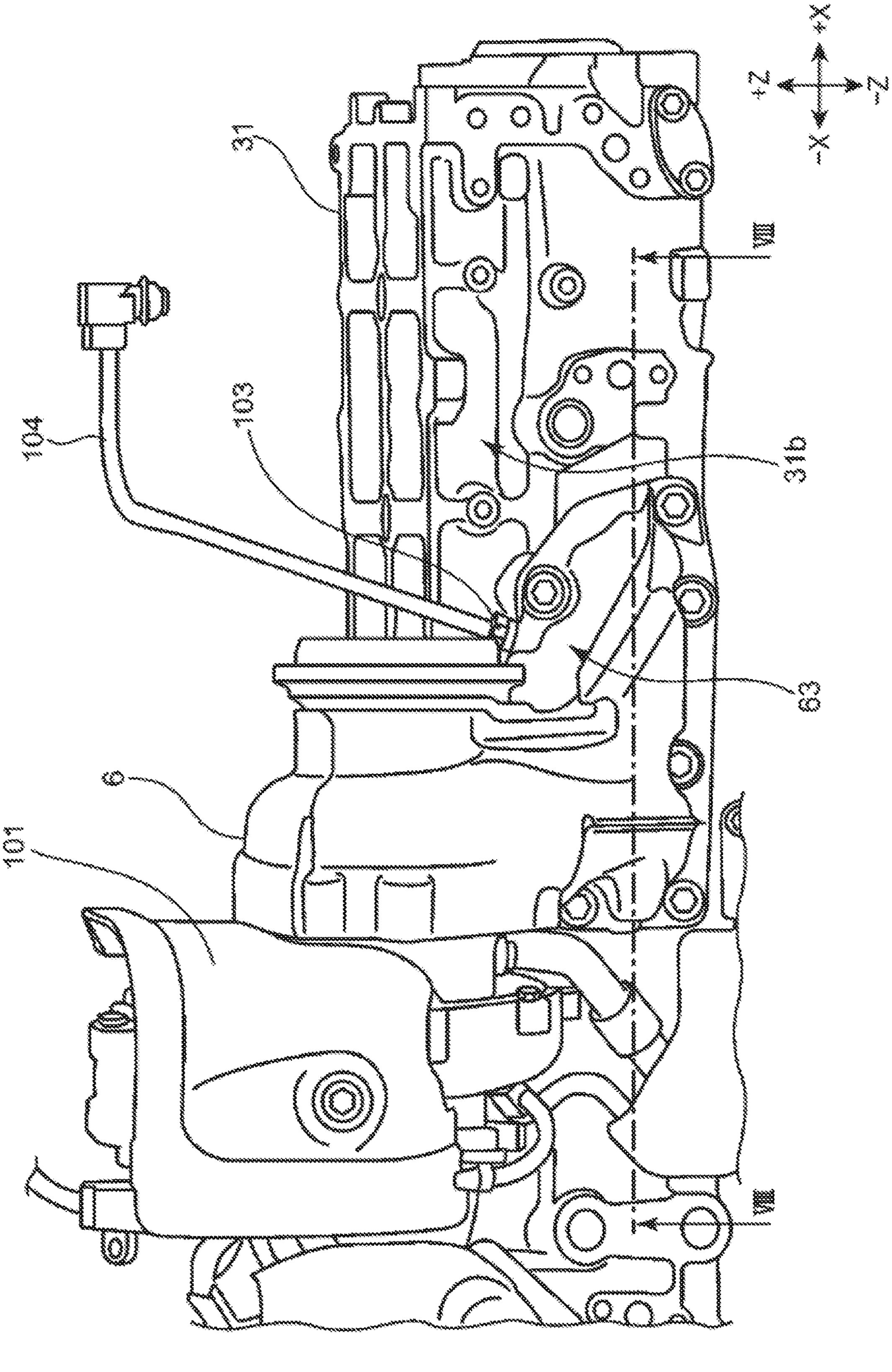
FIG. 6 is an enlarged side view schematically illustrating a part of the engine.
Figure 7:
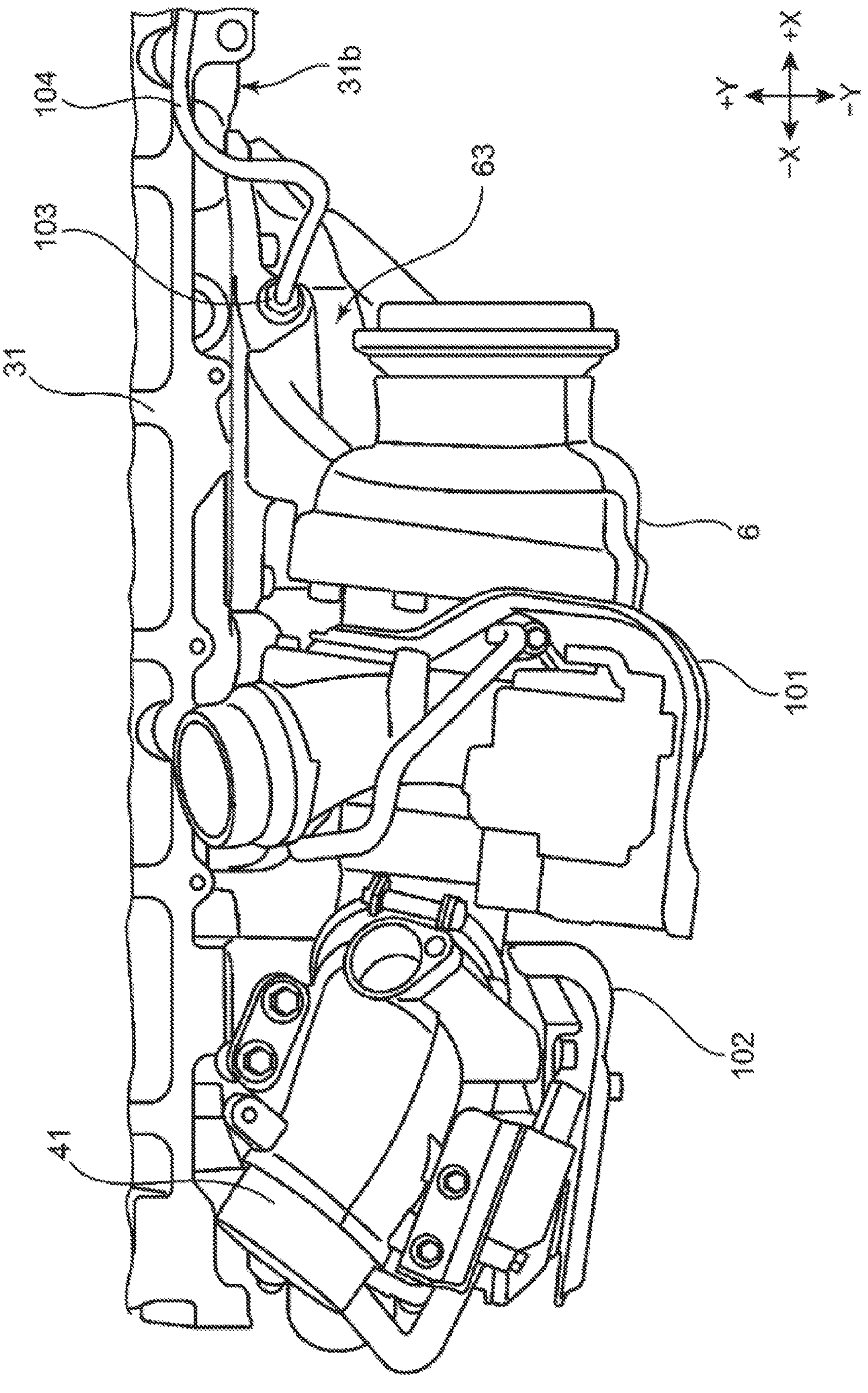
FIG. 7 is a plan view schematically illustrating the part of the engine from above.

The disposed location of the exhaust gas temperature sensor 103 is described using FIGS. 6 and 7. FIG. 6 is an enlarged side view schematically illustrating a part of the engine 2, and FIG. 7 is an enlarged plan view schematically illustrating the part of the engine 2 from above.

As illustrated in FIGS. 6 and 7, in the engine 2, the exhaust gas temperature sensor 103 is provided to a part of the casing passage part 63 on the +Z side. As illustrated in FIG. 7, the exhaust gas temperature sensor 103 is provided to a part of the casing passage part 63 on the +Y side (a part close to the side surface part 31*b* of the cylinder head 31).

A sensor cable 104 for sending a detection signal (temperature information) to the ECU 10 (see FIG. 1) is connected to the exhaust gas temperature sensor 103. The sensor cable 104 is disposed so as to extend to the +Z side from a part where the exhaust gas temperature sensor 103 is attached to the casing passage part 63. As illustrated in FIG. 7, the sensor cable 104 extends to the +Z side along the side surface part 31*b* of the cylinder head 31.

6. Details of Disposed Location of Exhaust Gas Temperature Sensor 103 in Casing Passage Part 63

Figure 8:
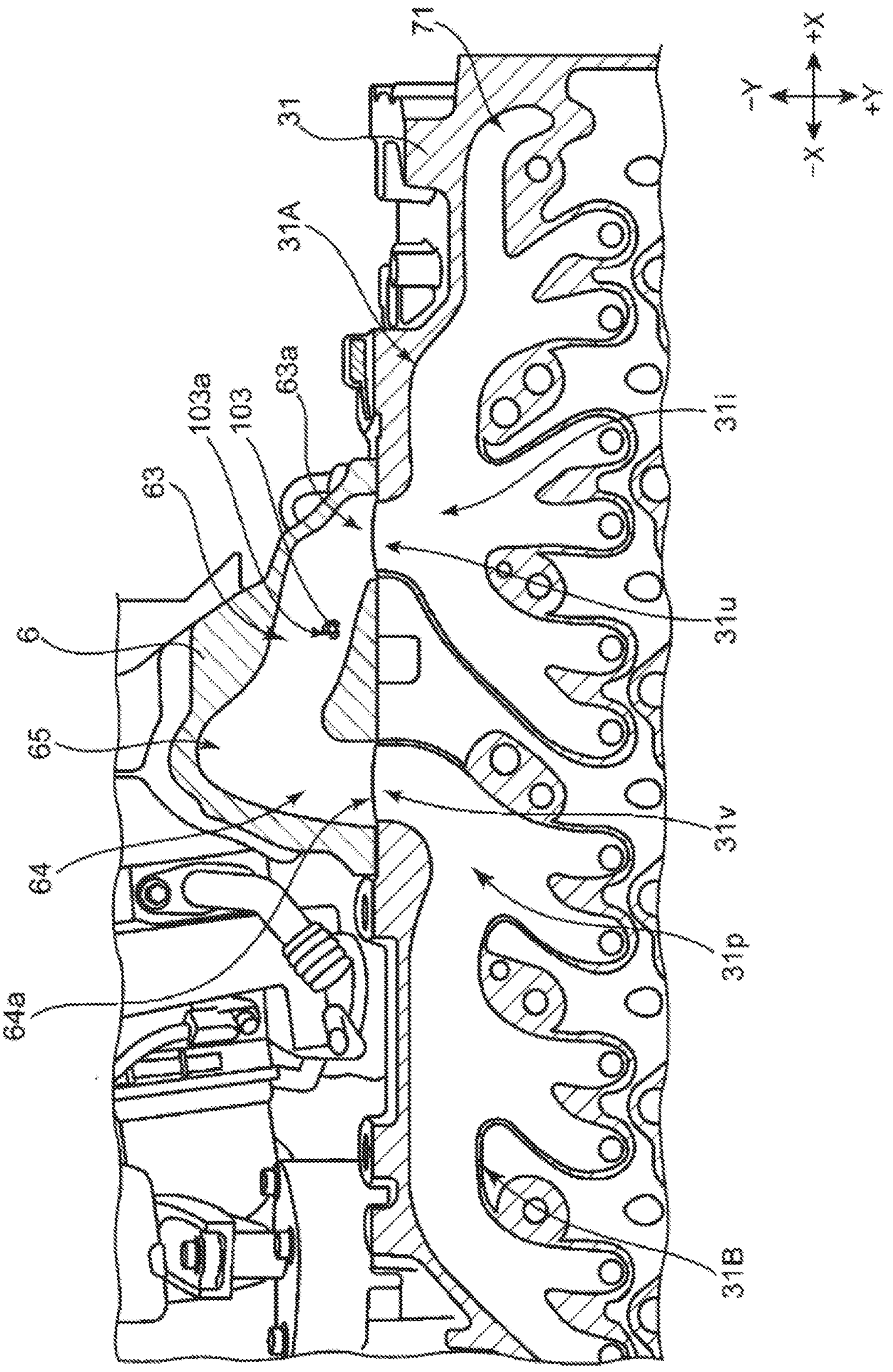
FIG. 8 is a cross-sectional view schematically illustrating a spatial relation between casing passage parts of a turbocharger and an exhaust gas temperature sensor, taken along a line VIII-VIII in FIG. 6.
Figure 9:
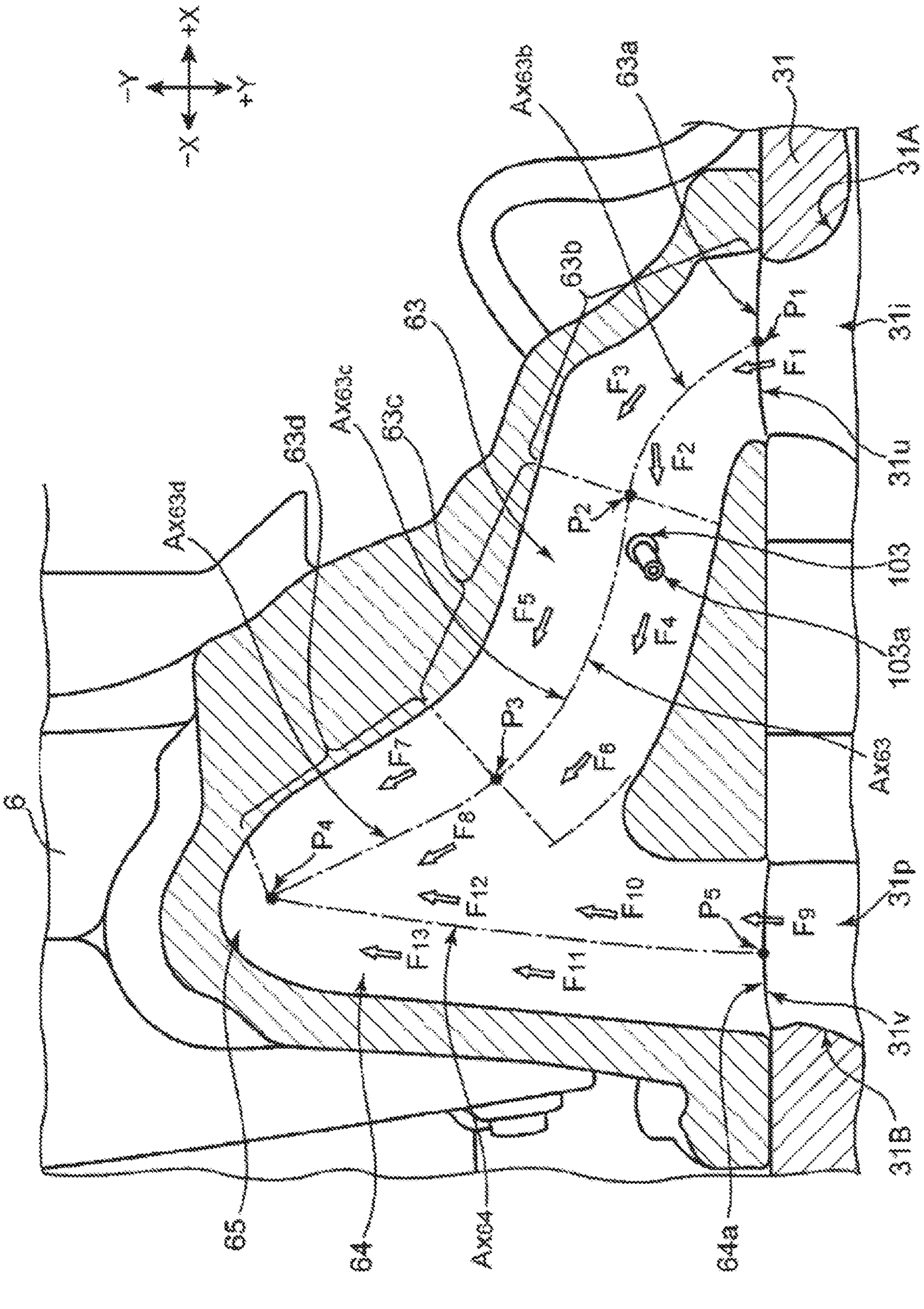
FIG. 9 is a cross-sectional view schematically illustrating a relation between shapes of the casing passage parts of the turbocharger and an attaching position of the exhaust gas temperature sensor.

Details of the disposed location of the exhaust gas temperature sensor 103 in the casing passage part 63 of the engine 2 are described using FIGS. 8 and 9. FIG. 8 is a schematic cross-sectional view taken along a line VIII-VIII in FIG. 6, and FIG. 9 is an enlarged cross-sectional view schematically illustrating the casing passage parts 63 and 64 and the casing collected part 65.

As illustrated in FIG. 8, an opening 63*a* of the casing passage part 63 is airtightly connected to the opening 31*u* of the port collected part 31*i* in the first exhaust port group 31A. Similarly, an opening 64*a* of the casing passage part 64 is airtightly connected to the opening 31*v* of the port collected part 31*p* in the second exhaust port group 31B.

The turbocharger 6 has the casing collected part 65 which collects the casing passage part 63 and the casing passage part 64, provided downstream of the casing passage part 63 and the casing collected part 64 (downstream in the exhaust gas flow direction). In the X-directions, the casing collected part 65 is offset to the −X side (toward the second exhaust port group 31B) from a middle part of the opening 63*a* and the opening 64*a*.

As illustrated in FIG. 9, a pipe axis (i.e., a center axis or central path) $Ax_{63}$ of the casing passage part 63 is comprised of three pipe axes $Ax_{63b}$, $Ax_{63c}$, and $Ax_{63d}$, which are serially located.

A part of the casing passage part 63 having the pipe axis $Ax_{63b}$ (a part from a point P1 to a point $P_2$) is curved so as to have a center of curvature on the +Y side (i.e., an upstream curved part 63*b*). A part of the casing passage part 63 having the pipe axis $Ax_{63c}$ (a part from the point $P_2$ to a point $P_3$) is curved so as to have a center of curvature on the −Y side (i.e., a downstream curved part 63*c*). A part of the casing passage part 63 having the pipe axis $Ax_{63d}$ (a part from the point $P_3$ to a point $P_4$) is a substantially straight tube part (i.e., a straight-extending part 63*d*). Note that the upstream curved part 63*b* according to this embodiment corresponds to a "second curved part", and the downstream curved part 63*c* corresponds to a "first curved part."

The pipe axis $Ax_{63b}$ of the upstream curved part 63*b* and the pipe axis $Ax_{63c}$ of the second curved part 63*c* contact each other at the point $P_2$ which is a point of inflection.

A sensor head 103*a* of the exhaust gas temperature sensor 103 is disposed at a part of the downstream curved part 63*c* which is closer to the point $P_2$ than the point $P_3$, and is radially outward of the pipe axis $Ax_{63c}$.

On the other hand, as illustrated in FIG. 9, in the casing passage part 64, a pipe axis $Ax_{64}$ extends substantially straightly from a point $P_5$ of the opening 64*a* to the point $P_4$ which is a connection with the casing collected part 65.

7. Flow of Exhaust Gas in Casing Passage Parts 63 and 64

A flow of exhaust gas in the casing passage parts 63 and 64 is now described using FIG. 9.

As illustrated in FIG. 9, an exhaust gas $F_1$ introduced into the casing passage part 63 first passes through the upstream curved part 63*b*. Here, the exhaust gas $F_1$ contains an exhaust gas $F_2$ which flows through a radially inward portion of the curve, and an exhaust gas $F_3$ which flows through a radially outward portion of the curve. The exhaust gas $F_1$ introduced into the upstream curved part 63*b* from the opening 63*a* flows to the −Y side within an area closer to the opening 63*a*, and the flow direction is then changed to the −X side by a wall part located radially outward of the curve. Accordingly, a portion of the flow of the exhaust gas forms a portion of the exhaust gas $F_2$ after the flow direction is changed to the −X side and to the +Y side.

Among exhaust gas $F_4$-$F_6$ which passes through the downstream curved part 63*c*, the flow velocities of the exhaust gas $F_4$ and $F_6$ located radially outward of the curve in the downstream curved part 63*c* become faster than the exhaust gas $F_5$ located radially inward. That is, in the downstream curved part 63*c*, the exhaust gas $F_4$ and $F_6$ of which the flow velocities are faster than the exhaust gas $F_5$ located radially inward of the curve passes through the sensor head 103*a* of the exhaust gas temperature sensor 103.

Exhaust gas $F_7$ and $F_8$ sent to the straight-extending part 63*d* flows through the straight-extending part 63*d*, and then outflows to the casing collected part 65.

On the other hand, an exhaust gas $F_9$ introduced into the casing passage part 64 flows straightly through the casing passage part 64 (i.e., exhaust gas $F_{10}$ and $F_{11}$). The exhaust gas $F_{10}$ and $F_{11}$ which flow through the casing passage part 64 do not have a difference in the flow velocity, or if any, the difference is very small. This is because both the exhaust gas $F_{10}$ and $F_{11}$ flow straight and hardly cause a difference in the flow velocity.

Exhaust gas $F_{12}$ and $F_{13}$ which flow through the casing passage part 64 outflow to the casing collected part 65 as they are.

8. Effects

In the engine 2 according to this embodiment, the HP-EGR passage 71 is connected to the exhaust port 31*c* of the first exhaust port group 31A, and the exhaust gas temperature sensor 103 is provided to the casing passage part 63. The casing passage part 63 is connected at the opening 63*a* to the opening 31*u* of the port collected part 31*i* in the first exhaust port group 31A.

Therefore, the engine 2 according to this embodiment can detect by the exhaust gas temperature sensor 103 a temperature approximated to the temperature of the exhaust gas outflowed to the HP-EGR passage 71.

Moreover, since in the engine 2 according to this embodiment the exhaust gas temperature sensor 103 is not provided to the cylinder head 31 but to the casing passage part 63, it excels in the maintainability of the exhaust gas temperature sensor 103.

Further, as described using FIG. 6, since in the engine 2 according to this embodiment the sensor cable 104 connected to the exhaust gas temperature sensor 103 is disposed so as to extend to the +Z side (upward), a higher maintainability is secured.

Since in the engine 2 according to this embodiment the casing passage part 63 has the downstream curved part 63*c*, and the sensor head 103*a* of the exhaust gas temperature sensor 103 is provided to the downstream curved part 63*c*, the temperature detection can be performed in a higher accuracy. That is, in this embodiment, by providing the downstream curved part 63*c* to the casing passage part 63, the exhaust gas $F_1$ introduced into the casing passage part 63 is mixed inside the pipe, and therefore, the exhaust gas temperature sensor 103 can detect the temperature with high accuracy.

In the engine 2 according to this embodiment, by providing the exhaust gas temperature sensor 103 at the location radially outward in the downstream curved part 63*c* (radially outward of the pipe axis $Ax_{63c}$), the temperature of the exhaust gas $F_4$ and $F_6$ which flow with the faster flow velocity can be detected. Therefore, in the engine 2 according to this embodiment, the temperature detection is possible by the exhaust gas temperature sensor 103 with higher accuracy.

Since in the engine 2 according to this embodiment the upstream curved part 63*b* contacts the downstream curved part 63*c* at the point of inflection (i.e., point $P_2$), the exhaust gas $F_2$ and $F_3$ pass through the point of inflection (point $P_2$) to eccentrically flow toward the part radially outward in the downstream curved part 63*c*. Therefore, the engine 2 according to this embodiment can detect the temperature of exhaust gas with higher accuracy.

Since the engine 2 according to this embodiment is provided with the casing collected part 65 collecting the casing passage part 63 and the casing passage part 64, the reduction in the weight and size of the exhaust passage 51 downstream of the casing collected part 65 is achieved.

Since in the engine 2 according to this embodiment the casing passage part 64 is provided substantially linearly (the pipe axis $Ax_{64}$ is substantially straight), the exhaust resistance of the exhaust gas $F_{10}$-$F_{13}$ which pass through the casing passage part 64 can be lowered.

As described using FIG. 5 and other figures, in the engine 2 according to this embodiment, the disposed location of the opening 31*u* of the port collected part 31*i* in the first exhaust port group 31A and the disposed location of the opening 31*v* of the port collected part 31*p* in the second exhaust port group 31B differ from each other, thereby achieving both the high-accuracy temperature detection of exhaust gas and the high exhaust efficiency.

Since the engine 2 according to this embodiment injects fuel alternately with time to the cylinders 3*a*-3*c* belonging to the first cylinder group 3A and the cylinders 3*d*-3*f* belonging to the second cylinder group 3B, the exhaust interference can be reduced and the higher exhaust efficiency can be achieved.

As described above, in the engine 2 according to this embodiment, the plurality of exhaust ports 31*c*-31*h* and 31*j*-31*o* and the port collected parts 31*i* and 31*p* are provided in the cylinder head 31, the HP-EGR passage 71 is connected to the exhaust port 31*c*, and the temperature of exhaust gas can accurately be detected by the exhaust gas temperature sensor 103.

[Modifications]

Although in the engine 2 according to the above embodiment the HP-EGR passage 71 is selectively connected only to the first exhaust port group 31A, the present disclosure is not limited to this structure. The EGR passage may be connected to the second exhaust port group 31B, or may be connected to both the first exhaust port group 31A and the second exhaust port group 31B.

Note that the exhaust gas temperature sensor may be provided to at least any one of the exhaust-pipe parts connected to the exhaust port group to which the EGR passage is connected.

Although in the above embodiment the existence of a cylinder pausing device in the engine 2 is not particularly described, the engine of the present disclosure may also adopt the cylinder pausing device.

If adopting the cylinder pausing device, the exhaust gas temperature sensor may be provided to the exhaust-pipe part connected to the exhaust port group where the cylinder pausing is not carried out.

Moreover, in the present disclosure, the EGR passage may be branched from the exhaust-pipe part connected to the side surface part of the cylinder head (corresponding to the "casing passage parts 63 and 64" of the above embodiment).

Although in the above embodiment and modification, the structure in which the two exhaust ports are connected to one cylinder is adopted, the present disclosure is not limited to this structure. For example, other structures in which one exhaust port is connected to one cylinder, and three or more exhaust ports are connected to one cylinder, may also be adopted.

Although in the above embodiment and modification, the engine 2 is provided with a single turbocharger 6 as one example, the present disclosure is not limited to this structure. For example, a naturally aspirated engine without the turbocharger may also be adopted, or an engine with two or more turbochargers may also be adopted, or an engine with an electric supercharger, a mechanical supercharger, etc. may also be adopted.

Although in the above embodiment and modification, the 6-cylinder diesel engine is adopted as one example of the engine body 3, the present disclosure is not limited to this structure. For example, the number of cylinders may be four or five, or may be seven or more. Moreover, the engine may be a gasoline engine, or may be a V-type, W-type, or horizontally opposed engine, without being limited to the in-series engine.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

2 Multi-Cylinder Engine
3 Engine Body
3A First Cylinder Group
3B Second Cylinder Group
3*a*-3*f* Cylinder
4 Intake System
5 Exhaust System
6 Turbocharger
7 HP-EGR device
31, 131 Cylinder Head
31A First Exhaust Port Group (First Exhaust Passage Group)
31B Second Exhaust Port Group (Second Exhaust Passage Group)
31*c*-31*h*, 31*j*-31*o* Exhaust Port (Independent Exhaust Passage Part)
31*i*, 31*p* Port Collected Part (Collective Exhaust Passage Part)
31*u*, 31*v* Opening
51 Exhaust Passage
63 Casing Passage Part (First Exhaust-pipe Part)
63*b* Upstream Curved Part (Second Curved Part)
63*c* Downstream Curved Part (First Curved Part)
64 Casing Passage Part (Second Exhaust-pipe Part)
65 Casing Collected Part (Collective Exhaust-pipe Part)
71 HP-EGR Passage (EGR Passage)
103 Exhaust Gas Temperature Sensor
103*a* Sensor Head
$Ax_{63}$, $Ax_{63b}$, $Ax_{63c}$ Pipe Axis

What is claimed is:

1. A multi-cylinder engine having an engine body with a cylinder head, the engine comprising:
- a first cylinder group provided to the engine body and comprised of three cylinders disposed adjacent to each other;
- a first exhaust passage group having three independent exhaust passage parts provided to the cylinder head and connected to the first cylinder group, respectively, and a first collective exhaust passage part provided in the cylinder head and collecting the three independent exhaust passage parts at a location downstream in an exhaust gas flow direction, and having an opening formed in a side surface part of the cylinder head;
- a first exhaust-pipe part connected to the opening of the first collective exhaust passage part;
- an exhaust gas recirculation (EGR) passage connected at a first end to one of the independent exhaust passage parts of the first exhaust passage group and connected at a second end to an intake passage, a part of the EGR passage being formed in the cylinder head;
- a turbocharger;
- a second cylinder group provided to the engine body, comprised of three cylinders disposed adjacent to each other, and provided adjacently to the first cylinder group;
- a second exhaust passage group having three independent exhaust passage parts provided in the cylinder head and connected to the second cylinder group, respectively, and a second collective exhaust passage part provided in the cylinder head and collecting the three independent exhaust passage parts at a location downstream in the exhaust gas flow direction, and having an opening formed in the side surface part of the cylinder head;
- a second exhaust-pipe part connected to the opening of the second collective exhaust passage part; and
- an exhaust gas temperature sensor provided to the first exhaust-pipe part, wherein
- the turbocharger includes the first exhaust-pipe part and the second exhaust-pipe part, the turbocharger includes a collective exhaust-pipe part provided downstream in the exhaust gas flow direction from the first exhaust-pipe part and the second exhaust-pipe part, and the collective exhaust-pipe part is connected to a turbine of the turbocharger.

2. The multi-cylinder engine of claim 1, wherein the first exhaust-pipe part has a first curved part where a pipe axis of the first exhaust-pipe part curves, and wherein the exhaust gas temperature sensor is provided to the first curved part.

3. The multi-cylinder engine of claim 2, wherein the exhaust gas temperature sensor is disposed radially outward of the curve from the pipe axis of the first curved part.

4. The multi-cylinder engine of claim 2, wherein the first exhaust-pipe part has a second curved part, provided upstream in the exhaust gas flow direction from the first curved part, where the pipe axis of the first exhaust-pipe part curves, and wherein the first curved part and the second curved part are connected to each other with a point of inflection of the pipe axes therebetween.

5. The multi-cylinder engine of claim 2, wherein the second exhaust-pipe part is formed so that a pipe axis of the second exhaust-pipe part is more linear than the pipe axis of the first exhaust-pipe part.

6. The multi-cylinder engine of claim 1, wherein fuel is injected alternately over time to the first cylinder group and the second cylinder group.

7. A multi-cylinder engine having an engine body with a cylinder head, the engine comprising:

a first cylinder group provided to the engine body, and comprised of three cylinders disposed adjacent to each other;

a first exhaust passage group having three independent exhaust passage parts provided in the cylinder head and connected to the first cylinder group, respectively, and a first collective exhaust passage part provided in the cylinder head and collecting the three independent exhaust passage parts at a location downstream in an exhaust gas flow direction, and having an opening formed in a side surface part of the cylinder head;

a first exhaust-pipe part connected to the opening of the first collective exhaust passage part;

an exhaust gas recirculation (EGR) passage connected at a first end to one of the independent exhaust passage parts of the first exhaust passage group and connected at a second end to an intake passage, a part of the EGR passage being formed in the cylinder head;

a turbocharger;

a second cylinder group provided to the engine body, comprised of three cylinders disposed adjacent to each other, and provided adjacently to the first cylinder group;

a second exhaust passage group having three independent exhaust passage parts provided in the cylinder head and connected to the second cylinder group, respectively, and a second collective exhaust passage part provided in the cylinder head and collecting the three independent exhaust passage parts at a location downstream in the exhaust gas flow direction, and having an opening formed in the side surface part of the cylinder head, wherein in a plan view of the second exhaust passage group in cylinder axis directions, the opening of the second collective exhaust passage part is offset toward the first exhaust passage group in a lineup direction of the three independent exhaust passage parts, and wherein in a plan view of the first exhaust passage group in the cylinder axis directions, the opening of the first collective exhaust passage part is disposed closer to a center in the lineup direction of the three independent exhaust passage parts, compared with the opening of the second collective exhaust passage part;

a second exhaust-pipe part connected to the opening of the second collective exhaust passage part; and an exhaust gas temperature sensor provided to the first exhaust-pipe part, wherein the turbocharger includes the first exhaust-pipe part and the second exhaust-pipe part, the turbocharger includes a collective exhaust-pipe part provided downstream in the exhaust gas flow direction from the first exhaust-pipe part and the second exhaust-pipe part, and the collective exhaust-pipe part is connected to a turbine of the turbocharger.

8. The multi-cylinder engine of claim 7, wherein the first exhaust-pipe part has a first curved part where a pipe axis of the first exhaust-pipe part curves, and wherein the exhaust gas temperature sensor is provided to the first curved part.

9. The multi-cylinder engine of claim 8, wherein the second exhaust-pipe part is formed so that a pipe axis of the second exhaust-pipe part is more linear than the pipe axis of the first exhaust-pipe part.

* * * * *